(12) United States Patent
Vigen

(10) Patent No.: US 12,330,743 B2
(45) Date of Patent: Jun. 17, 2025

(54) SNOWMOBILE

(71) Applicant: Arctic Cat Inc., Thief River Falls, MN (US)

(72) Inventor: David L. Vigen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/227,809

(22) Filed: Jul. 28, 2023

(65) Prior Publication Data

US 2023/0373593 A1 Nov. 23, 2023

Related U.S. Application Data

(63) Continuation of application No. 17/550,132, filed on Dec. 14, 2021, now Pat. No. 11,753,113, which is a continuation of application No. 16/864,452, filed on May 1, 2020, now Pat. No. 11,225,302, which is a continuation of application No. 15/857,823, filed on Dec. 29, 2017, now Pat. No. 10,676,157.

(60) Provisional application No. 62/441,812, filed on Jan. 3, 2017.

(51) Int. Cl.
*B62M 27/02* (2006.01)

(52) U.S. Cl.
CPC ....... *B62M 27/02* (2013.01); *B62M 2027/023* (2013.01); *B62M 2027/028* (2013.01)

(58) Field of Classification Search
CPC .................................................... B62M 27/02
See application file for complete search history.

(56) References Cited

U.S. PATENT DOCUMENTS

| | | | |
|---|---|---|---|
| 3,552,514 A * | 1/1971 | Alpers | B62J 27/30 293/146 |
| 3,981,373 A | 9/1976 | Irvine | |
| 4,779,695 A | 10/1988 | Yasui | |
| 6,016,943 A | 1/2000 | Johnson et al. | |
| 6,439,328 B1 * | 8/2002 | Vaillancourt | B62J 17/02 123/41.58 |
| 6,796,395 B1 | 9/2004 | Berg et al. | |
| 6,802,383 B2 | 10/2004 | Nishijima | |
| 6,808,034 B2 | 10/2004 | Nakano et al. | |
| 6,890,010 B2 | 5/2005 | Bergman | |
| 6,973,985 B2 * | 12/2005 | Yatagai | B62M 27/02 180/190 |

(Continued)

FOREIGN PATENT DOCUMENTS

JP 2000318675 A * 11/2000 ............. B62J 7/00

OTHER PUBLICATIONS

Non-Final Office Action Mailed on Oct. 25, 2023, Application No. 2,990,379, 8 pages.

*Primary Examiner* — Kevin Hurley
(74) *Attorney, Agent, or Firm* — Billion & Armitage

(57) ABSTRACT

Embodiments of the present disclosure describe a snowmobile including a chassis, a tunnel, an engine, a drive track and a drivetrain. The tunnel is attached to the chassis and includes running boards located on either side of the tunnel. The engine is attached to the chassis and within an engine bay. The drivetrain is operatively connected to the engine to deliver propulsive power to the drive track, wherein the running boards extend forward alongside at least a portion of the engine bay.

9 Claims, 14 Drawing Sheets

(56) References Cited

U.S. PATENT DOCUMENTS

| | | | |
|---|---|---|---|
| 7,080,704 B1 * | 7/2006 | Kerner | B62M 27/02 180/68.1 |
| 7,080,706 B2 | 7/2006 | Vaisanen | |
| 7,124,845 B2 * | 10/2006 | Pyykonen | B62M 27/02 180/190 |
| 7,222,689 B2 * | 5/2007 | Yatagai | B62M 27/02 123/196 R |
| 7,296,645 B1 * | 11/2007 | Kerner | B62M 27/02 180/68.1 |
| 7,357,207 B2 * | 4/2008 | Vaisanen | B62M 27/00 180/190 |
| 7,413,046 B2 | 8/2008 | Okada et al. | |
| 7,448,462 B2 | 11/2008 | Toyochika | |
| 7,815,002 B2 | 10/2010 | Etou | |
| 8,235,164 B2 | 8/2012 | Okada et al. | |
| 8,381,857 B1 | 2/2013 | Sampson et al. | |
| 8,733,773 B2 | 5/2014 | Sampson | |
| 8,919,477 B2 | 12/2014 | Conn et al. | |
| 9,174,702 B1 | 11/2015 | Gauthier et al. | |
| 9,346,508 B1 | 5/2016 | Lemieux | |
| 9,446,810 B2 | 9/2016 | Ripley | |
| 9,505,450 B1 | 11/2016 | Girouard et al. | |
| 9,738,301 B2 * | 8/2017 | Vezina | B62M 27/02 |
| 11,427,283 B2 * | 8/2022 | Edwards | B62M 27/00 |
| 2013/0193676 A1 | 8/2013 | Mertens et al. | |
| 2016/0025016 A1 | 1/2016 | Bernier et al. | |
| 2016/0200397 A1 * | 7/2016 | Vezina | B62M 27/02 180/193 |
| 2017/0241326 A1 | 8/2017 | Vezina et al. | |
| 2017/0305487 A1 | 10/2017 | Lefebvre et al. | |
| 2018/0186430 A1 * | 7/2018 | Vigen | B62M 27/02 |
| 2018/0237106 A1 | 8/2018 | Hedlund et al. | |
| 2021/0131366 A1 * | 5/2021 | Blake | F02B 37/186 |
| 2022/0212754 A1 * | 7/2022 | Stock | B62M 27/02 |
| 2022/0397068 A1 * | 12/2022 | Buchwitz | F02D 9/105 |
| 2023/0257064 A1 * | 8/2023 | Vigen | B62J 15/04 180/190 |
| 2024/0067303 A1 * | 2/2024 | Schroeder | H02K 1/2766 |
| 2024/0286711 A1 * | 8/2024 | Hoppe | B62M 27/02 |

* cited by examiner

SNOWMOBILE

This application is a continuation of U.S. application Ser. No. 17/550,132, filed on Dec. 14, 2021, which is a continuation of U.S. application Ser. No. 16/864,452, filed on May 1, 2020, which is a continuation of U.S. application Ser. No. 15/857,823, filed on Dec. 29, 2017, now U.S. Pat. No. 10,676,157 issued on Jun. 9, 2020, which claims the benefit of U.S. Provisional Application No. 62/441,812, filed on Jan. 3, 2017, and which applications are incorporated herein by reference. A claim of priority to all, to the extent appropriate, is made.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. One or more skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars.

SUMMARY

Embodiments of the present disclosure describe a snowmobile that includes a chassis, a tunnel, an engine, a drive track, and a drive train. The tunnel is attached to the chassis and includes running boards located on either side of the tunnel. The engine is attached to the chassis and within an engine bay. The drivetrain operatively interconnects the engine with the drive track for delivering propulsive power to the drive track, wherein the running boards extend forward alongside at least a portion of the engine bay.

Embodiments also describe a snowmobile that includes a chassis, a tunnel, a seat, an engine, a drive track, a drivetrain, and an exhaust system. The tunnel is attached to the chassis and the seat is attached to the top panel of the tunnel. The engine is attached to the chassis. A drivetrain operatively interconnects the engine with the drive track for delivering propulsive power to the drive track. The exhaust system comprises a first portion extending from the engine, a second portion extending toward the back of the snowmobile in a region between the seat and the top panel of the tunnel, and a third portion extending downward through the tunnel and opening to a region between the tunnel and a top of the drive track.

Embodiments also describe a snowmobile that includes a chassis, a hood, a bumper, an engine, a drive track, and a drivetrain. The bumper is affixed to the hood to form an integrated hood/bumper assembly. The engine is attached to the chassis. The drivetrain operatively interconnects the engine with the drive track for delivering propulsive power to the drive track.

BRIEF DESCRIPTION OF THE DRAWINGS

This written disclosure describes illustrative embodiments that are non-limiting and non-exhaustive. Reference is made to illustrative embodiments that are depicted in the figures, in which.

DETAILED DESCRIPTION

Embodiments of the present disclosure describe a snowmobile in which the engine and drivetrain mounted within an engine bay are defined by a width that is less than a width of running boards located alongside the tunnel of the snowmobile. Configuring the engine and drivetrain within a width less than the width of the running boards allows the running boards to extend, at least partially, alongside the engine bay, extending the forward position of the running boards as compared with typical snowmobile designs. The extended forward position of the running boards allows a rider's feet to be placed further forward along the length of the running boards, which is advantageous is certain riding conditions. In one embodiment, the forward position of the running board is positioned forward of the track drive axis. In one embodiment, the forward position of the running board is located forward of or approximately equal to the center-of-gravity (COG) of the snowmobile. As a result, the COG of the rider is approximately co-planar with the COG of the snowmobile. In some contexts, snowmobile maneuverability is improved by aligning the COG of the rider and the snowmobile.

Embodiments of this disclosure also describe an exhaust system that extends from the engine to the back of the snowmobile via a path that extends between the seat and the top of the tunnel. Benefits of this exhaust system include reduced width of the exhaust system, which aids in maintaining the width of the engine bay less than the width of the running boards, as well as a reduction in exhaust noise due to the outlet of the exhaust system being directed downward through the tunnel towards the track.

Embodiments of this disclosure also describe an integrated hood/bumper component. In one embodiment, the bumper is a structural component that is mounted to the hood and pivotally mounted to the chassis. This configuration allows the integrated hood/bumper to be lifted away from the engine about the pivot point, wherein the bumper supports the hood in the open position, thereby providing easy access to the engine and other components located in the engine bay.

Figure 1:
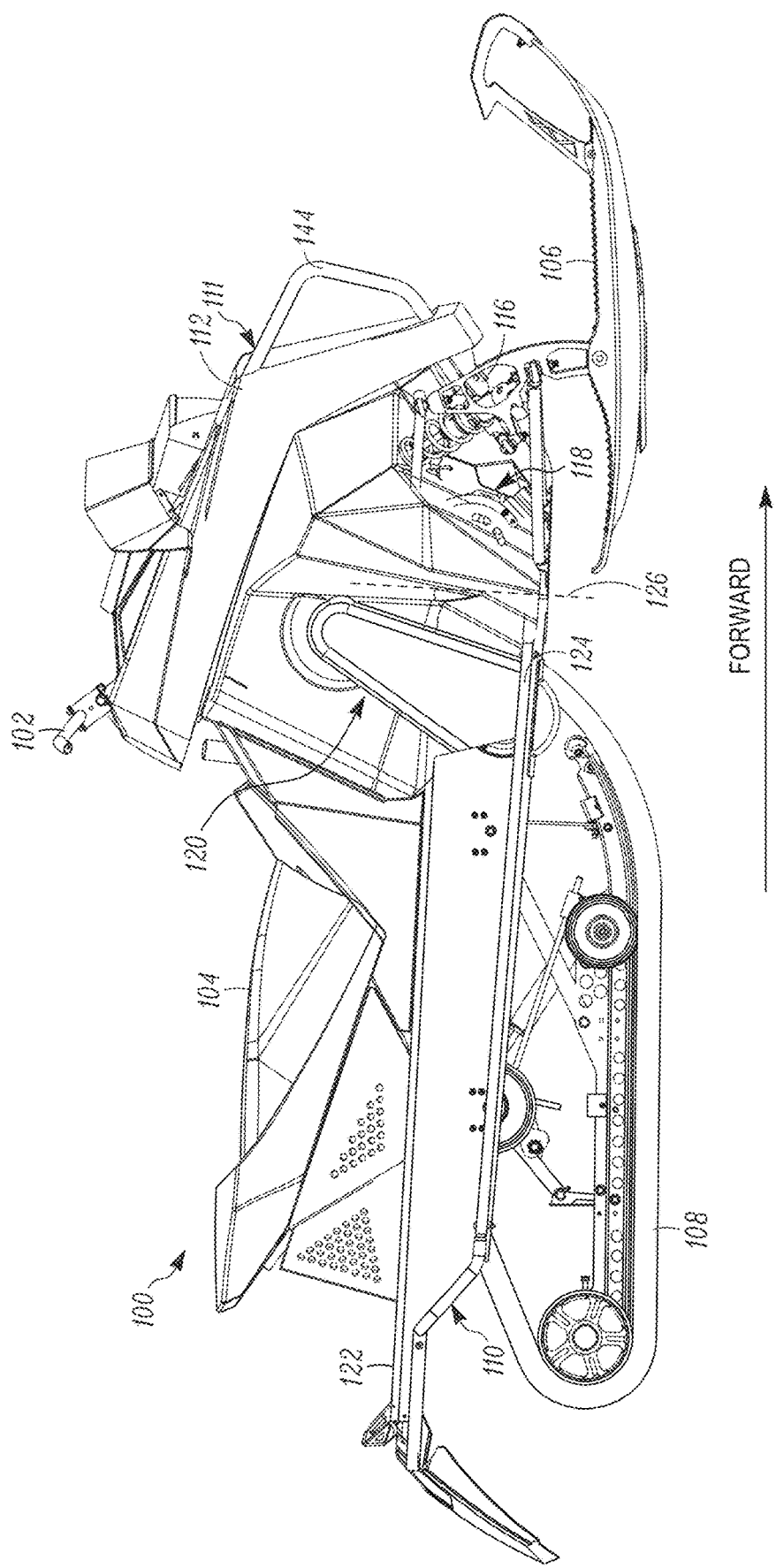
FIG. 1 illustrates a side view 100 of a snowmobile, according to some embodiments.
Figure 2:
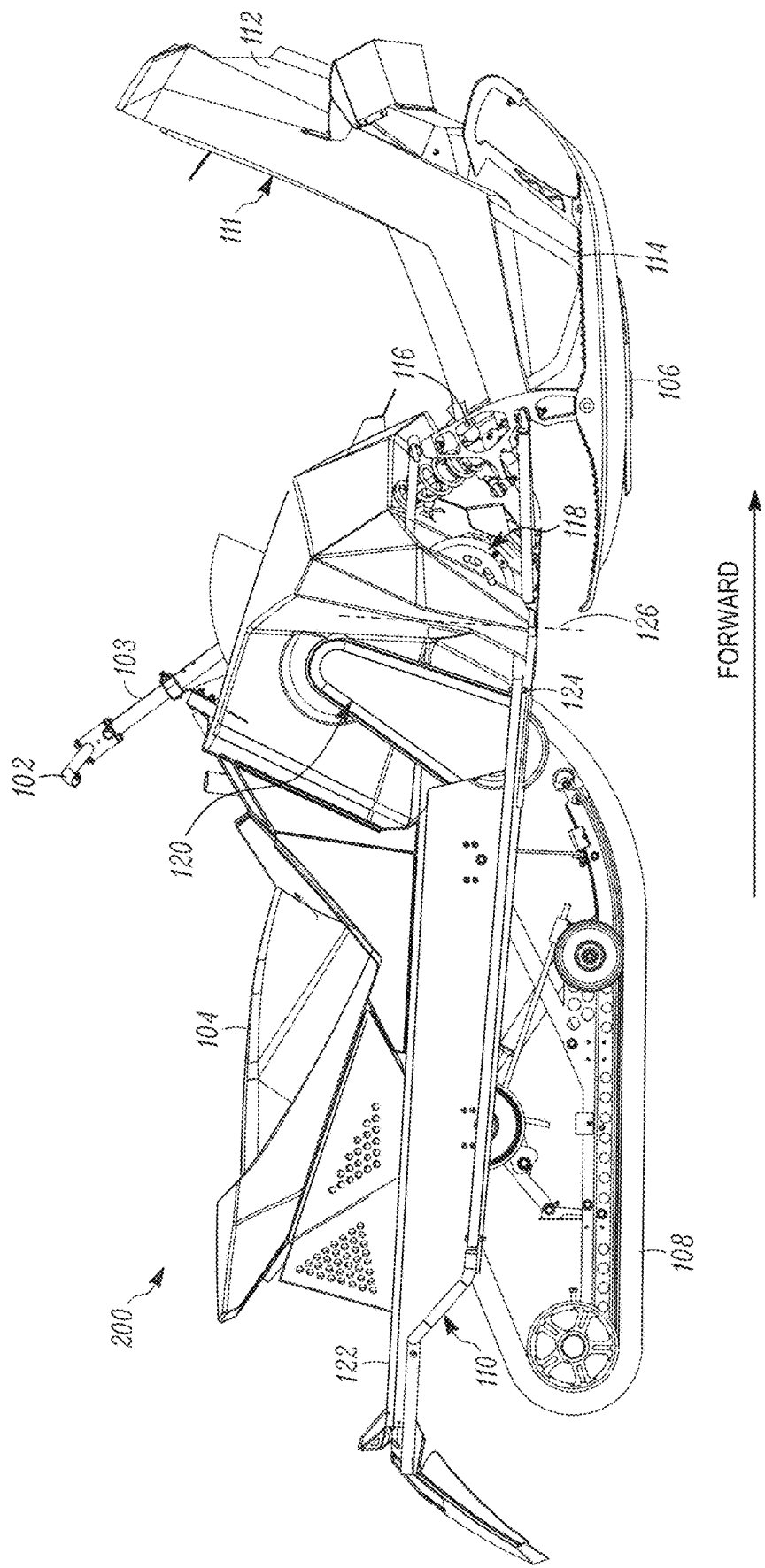
FIG. 2 illustrates a side view 200 of a snowmobile with an integrated hood/bumper in an open position, according to some embodiments.

Referring now to FIGS. 1 and 2, a side view 100 of a snowmobile is shown that includes an integrated hood/bumper in both a closed position and an open position. In the embodiments shown, the snowmobile includes handlebars 102, steering shaft 103 (see FIG. 2, for example), a seat 104, skis 106, a drive track 108, a chassis/frame 110, an integrated hood/bumper 111 that includes a hood portion 112 and a bumper portion 114, an engine 118, a drive train 120, and tunnel 122, which includes running boards 124 extending along the sides of tunnel 122. The chassis/frame 110 supports the tunnel 122, the engine 118, the drive train 120, the drive track 108, and skis 106. The position of the running boards is discussed throughout, as compared with the location of other components of the snowmobile. For purposes of this discussion, the running boards are described with respect to how far forward the running boards 124 extend, with the direction forward referring to the front of the snowmobile. For reference, the forward direction is indicated in a number of the Figures.

In particular, the embodiment shown in FIG. 1 illustrates the integration of hood portion 112 and bumper portion 114, and the hinged connection 116 of the integrated hood/bumper 111 to chassis/frame 110. The hood portion 112 covers and protects various components of the snowmobile. Bumper portion 114 is connected to chassis/frame 110 via hinged connection 116, and because the bumper portion 114 is structurally connected to the chassis/frame 110, the bumper portion 114 may be utilized to support the weight of the snowmobile. For example, the bumper portion can be utilized to lift and/or pull the snowmobile.

Figure 14:
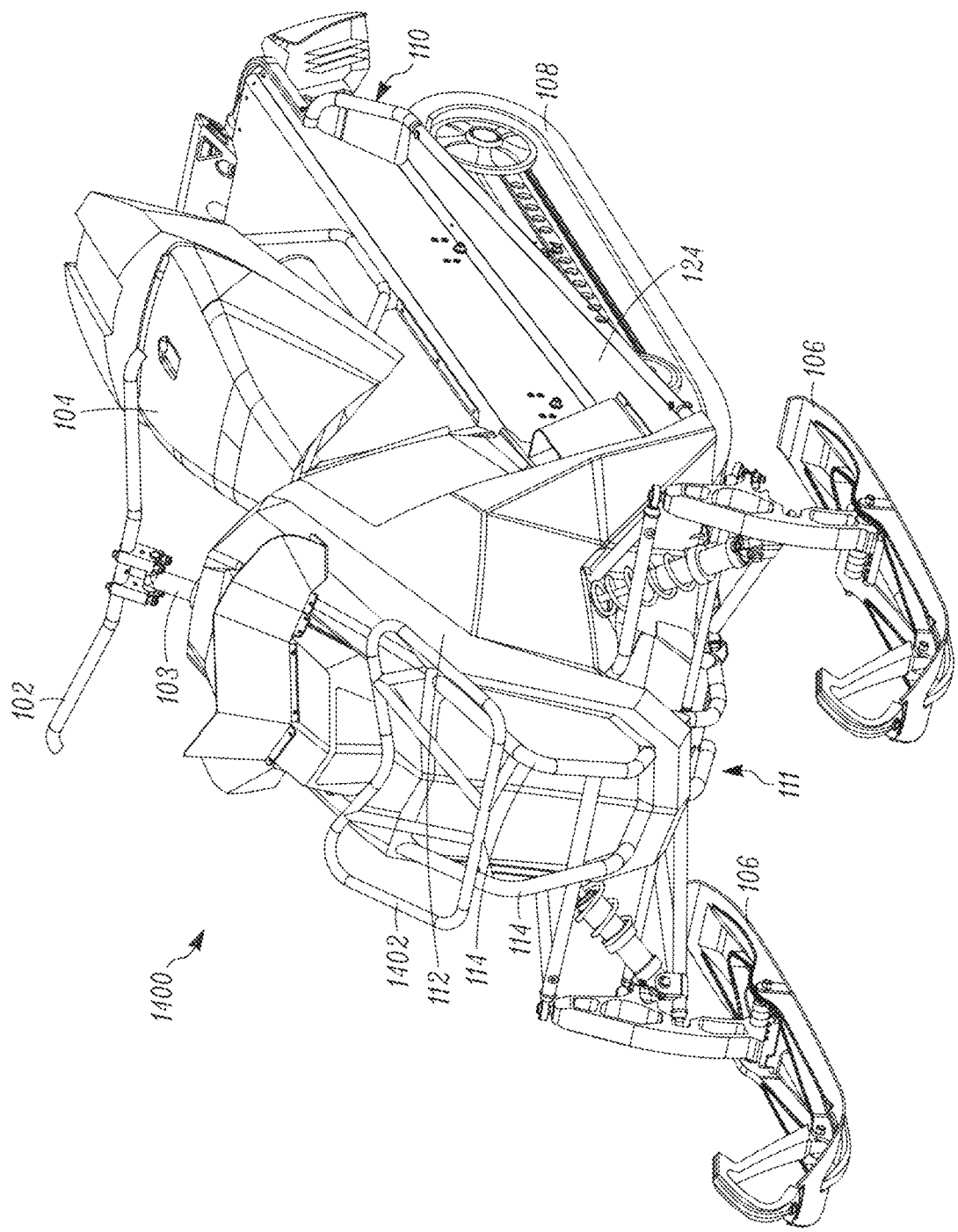
FIG. 14 illustrates a perspective view 1400 of the snowmobile that includes a rack positioned along the integrated hood/bumper, according to some embodiments.

The bumper portion 114 can be a single vertical component or a plurality of vertically aligned components (e.g., FIG. 14). The bumper portion 114 components may intersect outside the hood portion 112, inside the hood portion 112, or some combination thereof. The bumper portion 114 can be horizontally aligned and may be either a single component or a plurality of components, for example tubular steel or aluminum, though other materials and combinations of materials (e.g., steel or aluminum tubing in combination with a polymeric portion) can also be. As above, the horizontal components may intersect or be integrated at one or more contact points outside the hood portion 112, inside the hood portion 112, or some combination thereof. Alternatively, the bumper portion 114 may include individual components that are aligned neither substantially horizontally or vertically, such as in an "X" design. The bumper portion 114 can be rounded, squared, or some other configuration to provide protection from impact, provide a towable connection, or other feature, for example.

Referring now to FIG. 2, the integrated hood/bumper 111 is shown in the open position, pivoted about hinged connection 116 to expose engine 118 other components located in the engine bay. In the open position, bumper portion 114 can rest on the ground and supports the weight of integrated hood/bumper 111 or, the hood/bumper 111 can be supported by a tether which is attached to a suitable portion of the chassis. In some embodiments, the tether comprises a cable, such as a braided stainless steel cable. The integrated hood/bumper 111 can pivot from about a 45 degree angle (relative to the ground plane) to about a 180 degree angle to provide greater accessibility to the engine bay and related components.

As discussed in more detail with respect to FIGS. 4-10, the packaging and width of the engine 118 and drivetrain 120 allows the running boards 124 to extend further forward (as indicated by line 126 shown in FIGS. 1-6), relative to the location of the engine 118 and/or the drivetrain 120. In the embodiment shown in FIGS. 1 and 2, the running boards 124 extend forward to a position 126 at least partially adjacent to drivetrain 120, and forward of at least some elements of the drivetrain 120. As discussed in other embodiments, the forward position of the running boards 124 may also be described with respect to the axis of the track drive (shown in FIG. 6), the location of the lower A-arms connecting the chassis/frame 110 to the skis 106, as well as to the COG of the snowmobile. In general, however, a benefit of providing running boards that extend further forward than traditional running boards is it allows a rider's feet to be positioned further forward than in previous designs, which may provide additional rider control in certain riding conditions, for example by centralizing the weight of the rider near the COG of the snowmobile.

Figure 3:
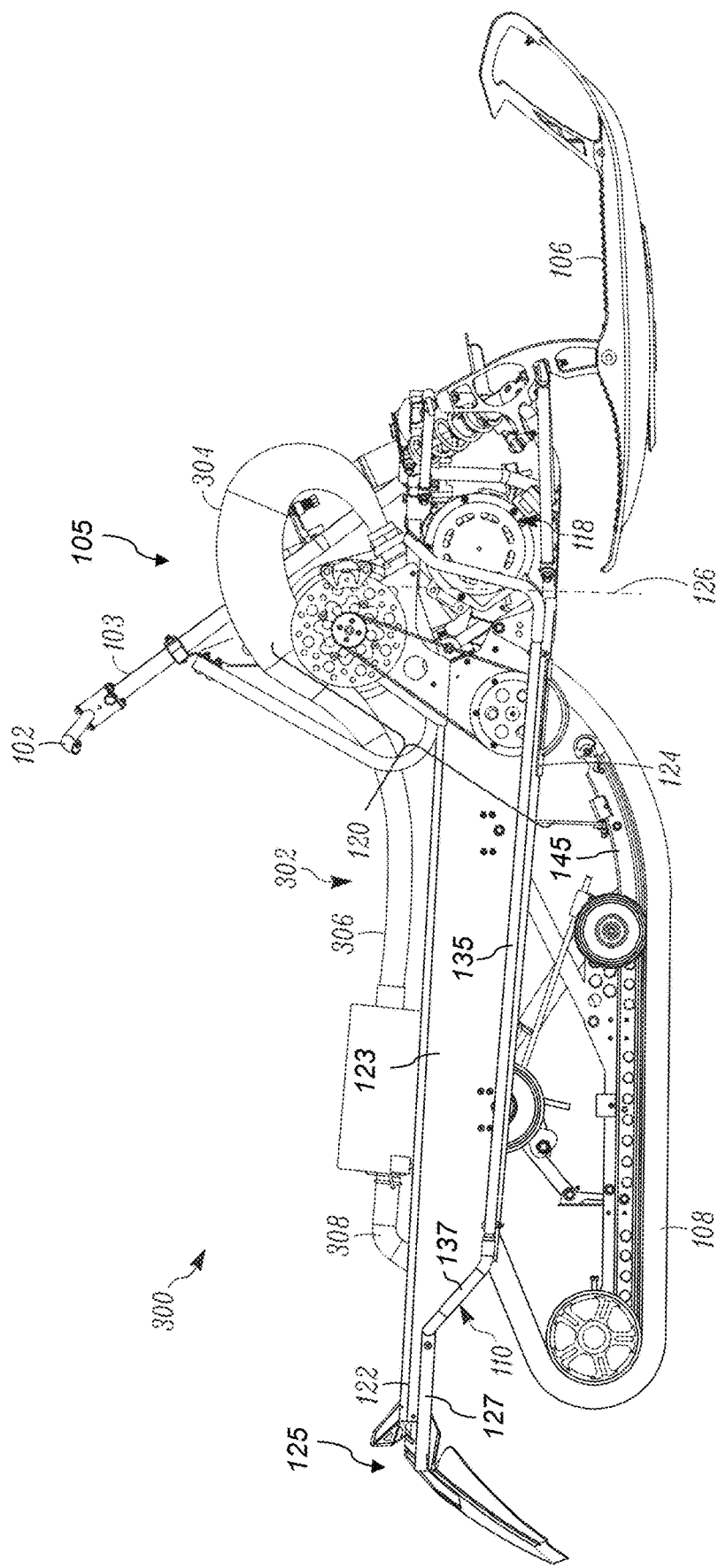
FIG. 3 illustrates a side view 300 of a snowmobile with the seat removed to show the exhaust system, according to some embodiments.

Referring now to FIG. 3, a side view 300 of a snowmobile is shown with the seat 104 and integrated hood/bumper 111 removed to illustrate the location of the exhaust system 302, according to some embodiments. In the embodiment shown in FIG. 3, exhaust system 302 includes a first portion 304 that extends from engine 118 to the area between the seat 104 and the top panel of the tunnel 122, a second portion 306 that extends along the top panel of the tunnel 122 and may include a muffler and/or catalytic converter, and a third portion 308 that extends downward through the tunnel 122 toward the drive track 108. The seat 104 (shown in FIGS. 1 and 2), is positioned over the top of the second portion 306. In some embodiments, the muffler is located under the seat 104. The tunnel 122 may include a side panel 123. The chassis/frame 110 may include a support member 135, a kick-up 137, a bumper arm 127, and a bumper 125. The support member 135 may be coupled to a forward frame 105. The snowmobile may include a skid rail 145.

More particularly, in the embodiment shown in FIG. 3, the first portion 304 of the exhaust system 302 extends from the engine 118 in an approximately forward direction. The first portion 304 curves upward, and around a top side of the drivetrain 120. As a result, the first portion 304 of the exhaust system 302 does not interfere with the position of the drivetrain 120, and thus does not contribute to the overall width of the engine 118 and/or drivetrain 120. Second portion extends along the top of the tunnel 122, and third portion 308 extends through tunnel 122 and opens towards drive track 108. In this way, exhaust from the engine is directed along the path defined by exhaust system 302 and is directed or output in the area between the tunnel 122 and the drive track 108. A benefit of outputting the exhaust in this manner is that the overall noise level of the snowmobile is reduced. Additionally, and as mentioned elsewhere, by moving the exhaust system 302 to a central or interior aligned position, the overall width of the engine bay can be narrowed.

Figure 4:
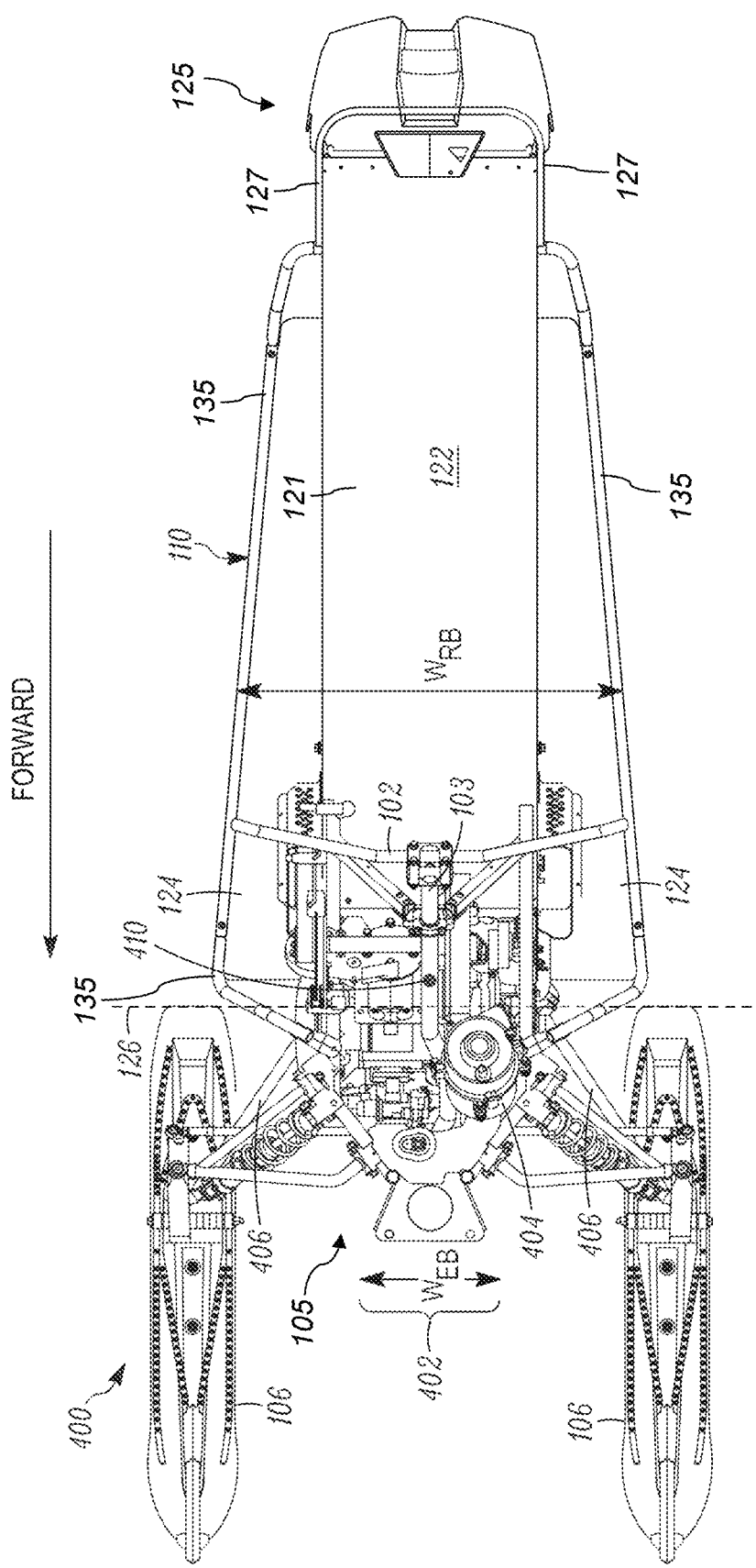
FIG. 4 illustrates a top view 400 of a snowmobile, according to some embodiments.

In some embodiments, the engine can be oriented such that the exhaust is directed rearwardly without the first portion 304 that extends in an approximately forward direction. In this way, a reduction in the total length of exhaust pipe can be achieved, resulting in a lighter exhaust system Referring now to FIG. 4, a top view 400 of a snowmobile is shown with integrated hood/bumper 111 and exhaust system 302 removed to illustrate the width of the engine bay 402 relative to running boards 124. The approximate width of the engine bay is represented as web, while approximate width of the running boards is illustrated as wrb (outside width of the running boards). Engine bay 402 includes a number of components, including the engine 118, the drivetrain 120, and an air filter 404. In the embodiment shown in FIG. 4, the engine 118 is a single-cylinder engine, however in other embodiments, engine 118 may be implemented as a two-cylinder engine, four cylinder engine, etc., and may be either a two-stroke or four-stroke type engine. In some embodiments, the center of mass of the engine 118 is offset from a longitudinal centerline plane of the snowmobile, which allows the drivetrain 120 to be positioned so as to reduce the overall width web of the engine bay. In particular, as illustrated in FIG. 4, the width web of the engine bay 402 is less than the width wrb of the running boards 124. As described in more detail with respect to FIG. 5, a portion of the running boards 124 may be fitted around one or more engine or driveline components, thereby allowing the running boards 124 to extend forward alongside the engine components, to a forward position indicated by dashed line 126. In addition, as discussed with respect to the side view shown in FIG. 3, in one embodiment the routing of the exhaust along the top of the tunnel 122 further reduces the width web of the engine bay 402, ensuring this width is less than the width wrb of the running boards 124. The tunnel 122 may include a top panel 121.

The furthermost position of the running boards 124 as indicated by dashed line 126 determines the furthermost foot position of the rider. With respect to FIGS. 4-10, the forward position 126 of the running boards 124 are described with respect to the relative locations of other components. For example, in the embodiment shown in FIG. 4, running boards 124 extend forward alongside the tunnel 122 to a position approximately equal in the forward direction to the attachment of the lower A-arm 406 to the chassis/frame 110. In another embodiment, the forward position 126 of the running boards 124 may be described relative to the location of the engine 118 and the drivetrain 120, wherein the running boards 124 extend forward alongside at least a portion of the engine 118 and the drivetrain 120, and is forward of the track drive axis illustrated in FIG. 6. The location of the running boards 124 relative to the engine 118 and drivetrain 120 is in contrast with typical snowmobile designs, in which the drivetrain components and/or exhaust components extend radially outward from that shown in FIG. 4. As a result, in typical snowmobiles, at least a portion of the drive train components and exhaust components extend to a width that prohibits the running boards from extending as far forward as that illustrated in FIG. 4.

In another embodiment, the position of the running boards 124 are described with respect to the center-of-gravity of the snowmobile, indicated by the dot labeled "410". While the center-of-gravity depends on a number of factors, including engine selection, gear selection (e.g., reverse gear required), in the embodiment shown in FIG. 4 the center-of-gravity 410 is located rearward of the forward position 126 of the running boards 124. As a result, this allows a rider's feet to be positioned forward of or approximately equal to the center-of-gravity 410 of the snowmobile.

Figure 5:
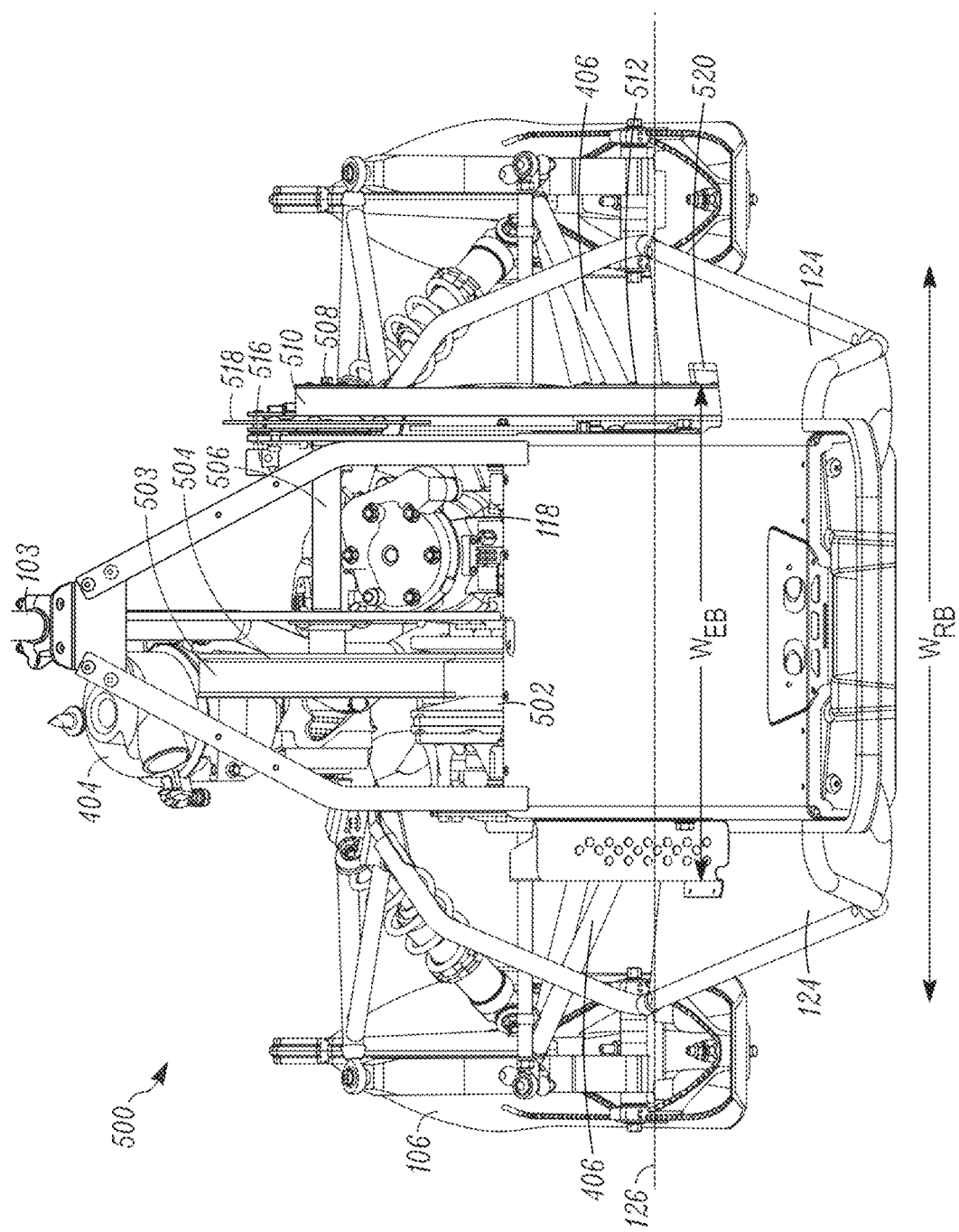
FIG. 5 illustrates a back view 500 of the front of a snowmobile, according to some embodiments.

Referring now to FIG. 5, a back view 500 of the front of a snowmobile is shown with integrated hood/bumper 111 and exhaust system 302 removed to illustrate the relative locations of the engine 118 and drivetrain 120 to the running boards 124. The view shown in FIG. 5 differs slightly from that shown in FIG. 4. In particular, while FIG. 4 showed a top view of the snowmobile, the view in FIG. 5 is looking forward from the back of the snowmobile at components included in the front of the snowmobile. For context, steering shaft 103 is illustrated, along with skis 106 and air filter 404. FIG. 5 illustrates the relative locations of drive train elements, including drive (or primary) clutch 502, endless, flexible drive belt 503, driven (or secondary) clutch 504, jack shaft 506, and transmission elements—which can be partially or fully enclosed in a case—that include top drive sprocket 508, cogged belt/chain 510, and bottom drive sprocket 512. In some embodiments, the cogged belt or chain 510 can be a gear drive.

In the embodiment shown in FIG. 5, engine 118 is a single-cylinder engine, and is offset from the centerline of the snowmobile (e.g., in this embodiment, positioned on the right side of the engine bay). As discussed above, in other embodiments, engine 118 may be implemented with multi-cylinder engines (e.g., two-cylinder, four cylinder). Mechanical power developed by engine 118 is communicated to primary clutch 502 by a drive shaft (not visible). Primary clutch 502 and secondary clutch 504 form a continuously variable transmission (CVT), which acts to communicate the power received from engine 118 to jack shaft 506. Primary clutch 502 and secondary clutch 504 each include both a stationary sheave and a movable sheave. As the speed of the engine increases, the movable sheaves are actuated toward or away from the stationary sheave, to selectively alter the gearing ratio of the CVT. Power communicated from the CVT to transmission case, which in turn communicates power to the track drive shaft (802, FIG. 8) to provide power to the track. In the embodiment shown in FIG. 5, the transmission case includes top drive sprocket 508 connected to receive power from the jack shaft 506, and in turn coupled to bottom drive sprocket 512 by cogged belt/chain 510. As noted previously, a gear drive can also be used in place of belt/chain 510. Bottom drive sprocket 512 drives the track drive shaft connected to transfer power to the drive track 108 (shown in FIG. 1).

In the embodiment shown in FIG. 5, the running board 124 includes a gap 520 that allows the bottom sprocket 512 to be located adjacent the running board 124. The running board continues forward of the bottom sprocket 512, allowing a rider's feet to be positioned forward of the bottom sprocket 512 and forward of the drive track shaft (not shown in the view) affixed to the bottom sprocket 512. In other embodiments, depending on the precise width of the engine 118 and drivetrain 120, and on the inside width or distance between running boards, the gap 520 may not be necessary, or may be smaller in size. However, as illustrated, the gap 520 does not prohibit a rider from positioning the rider's feet forward of the bottom sprocket 512.

Figure 6:
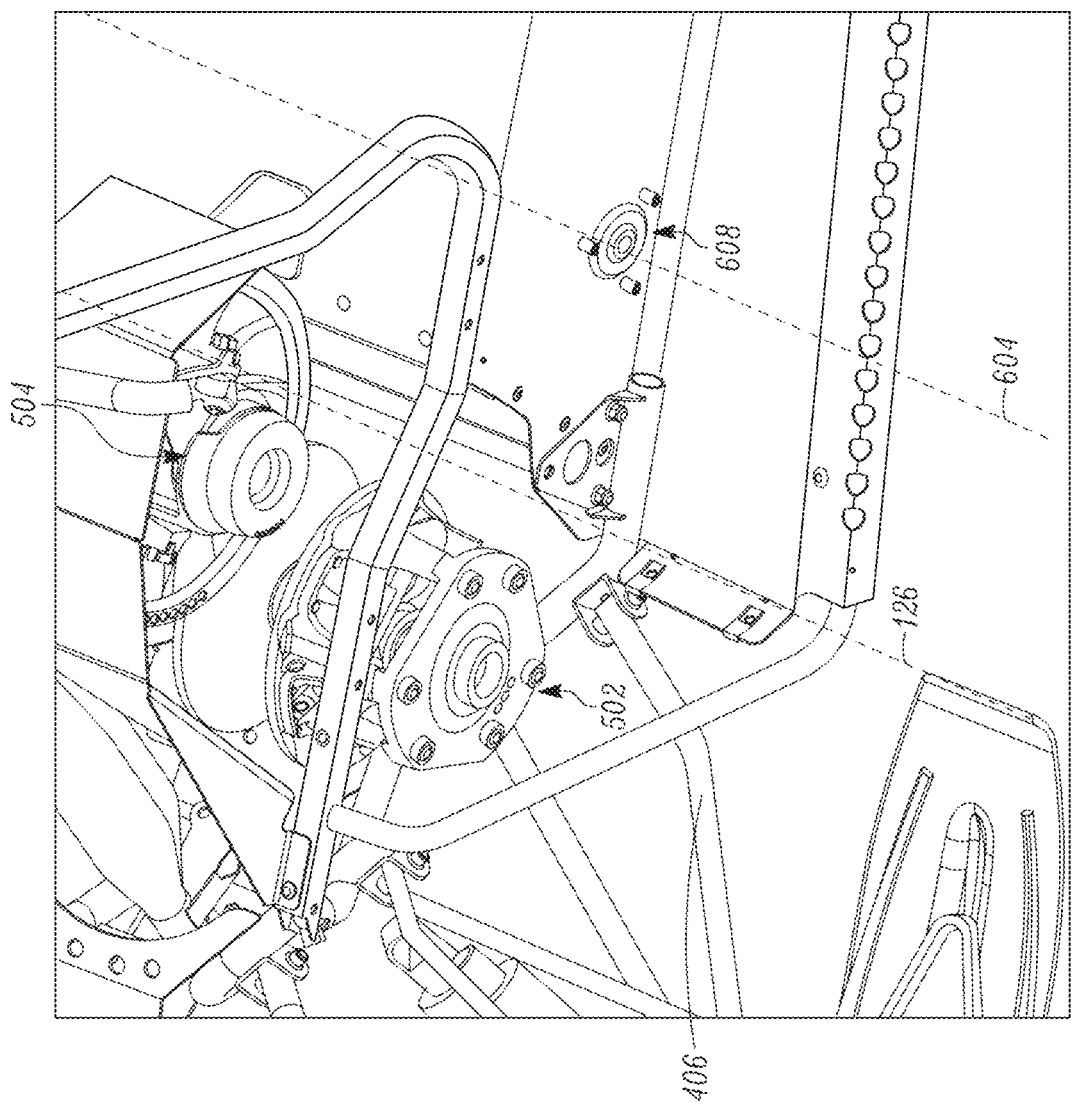
FIG. 6 illustrates a side perspective view 600 of an engine assembly and running boards of a snowmobile, according to some embodiments.

Referring now to FIG. 6, a side perspective view 600 of an engine assembly and running boards of the snowmobile are shown. Visible in this view are the primary clutch assembly 502, and a secondary clutch assembly 504. Also, partially visible is mounting bracket 608 (see also FIG. 8) associated with a distal end of the track drive shaft (not shown) coupled to propel the track drive 108. Mounting bracket 608 acts to secure the distal end of the track drive shaft to the tunnel 122 of the snowmobile. The axis of the drive track shaft is illustrated by dashed line 604 extending through mounting bracket 608, while the front of running boards 124 (i.e., front-most location) is illustrated by dashed line 126. The embodiment shown in FIG. 6 illustrates that the running boards 124 extend forward of the track drive shaft, illustrated by dashed line 604. As a result, this allows a rider's feet to be positioned forward of the track drive shaft.

In addition, the forward position of the running boards may also be defined with respect to other structural elements, such as the lower A-arms 406 connecting the skis 106 to the chassis/frame 110. In the embodiment shown in FIG. 6, the front of the running boards 124 end at approximately the same location as one leg of the lower—406 is connected to chassis/frame 110. In some embodiments, a portion of the running boards 124 can extend forward of a portion of the A-arm.

Figure 7:
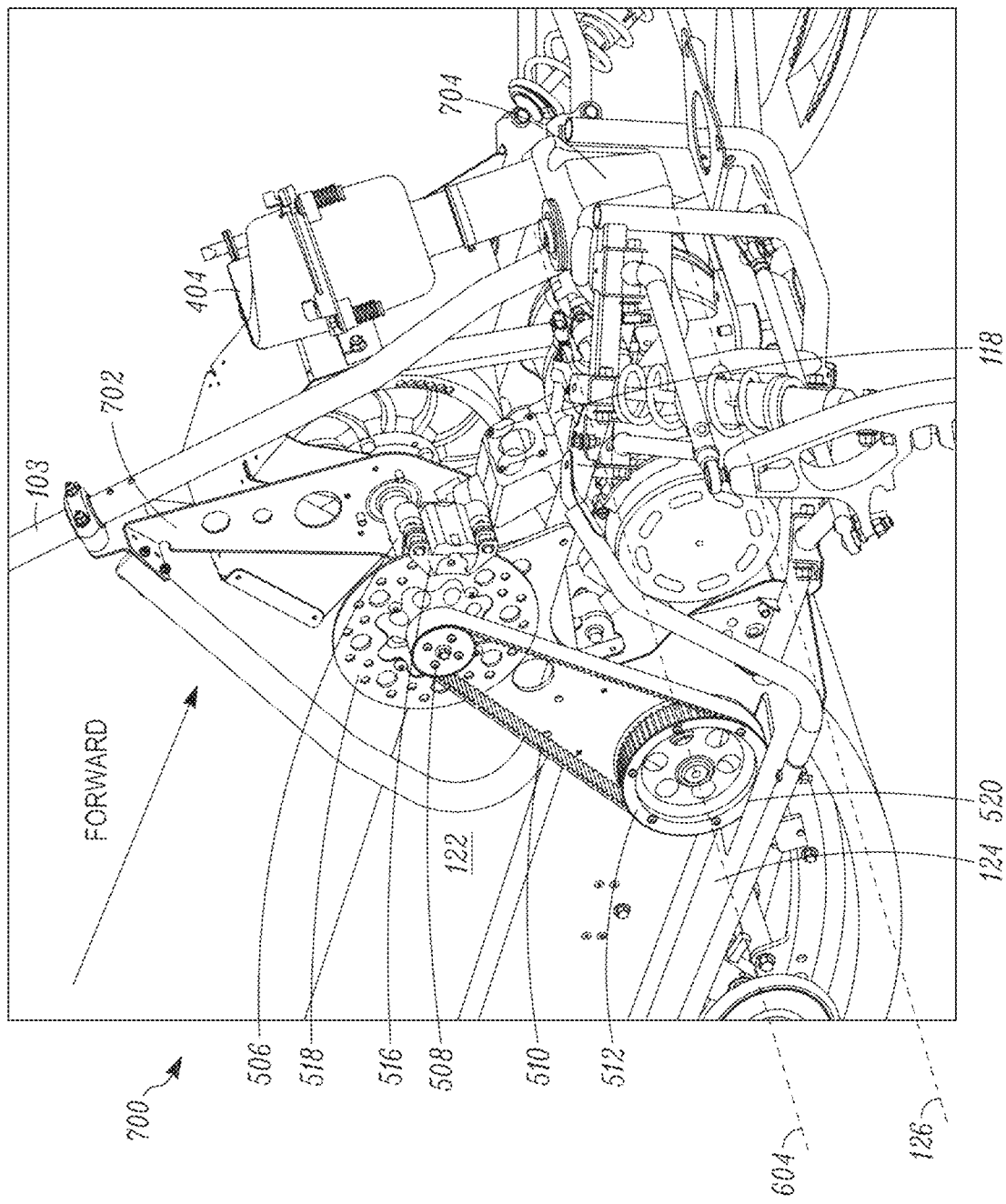
FIG. 7 illustrates a side perspective view 700 of an engine assembly of a snowmobile, according to some embodiments.

Referring now to FIG. 7, a side perspective view 700 of an engine assembly of a snowmobile is shown. The view shown in FIG. 7 is taken from the side of the snowmobile opposite that shown in FIG. 6. Visible in this view is the right-side running board 124, steering shaft 103, engine 118, air filter 404, top sprocket 508, cogged belt/chain 510, bottom sprocket 512, and intake manifold 704. Once again, the forward position of the running boards 124 is indicated by dashed line 126, and is located forward of the axis 604 defining the location of track drive shaft (which is driven by bottom sprocket 512). In addition, FIG. 7 illustrates the use of a small gap 520 to make room in the running board 124 for bottom sprocket 512, thereby allowing running board 124 to extend forward of bottom sprocket 512.

In addition, the embodiment shown in FIG. 7 illustrates the location of brake 516 and brake disc 518 on the drive shaft 506, located adjacent to sprocket 508. A benefit of locating brake 516 and brake disc 518 as shown in FIG. 7 is that the brake disc 518 and assembly is easily accessible for maintenance and repair. Moreover, a bracket 702 can locate both the jack shaft and the brake assembly (e.g., caliper).

Figure 8:
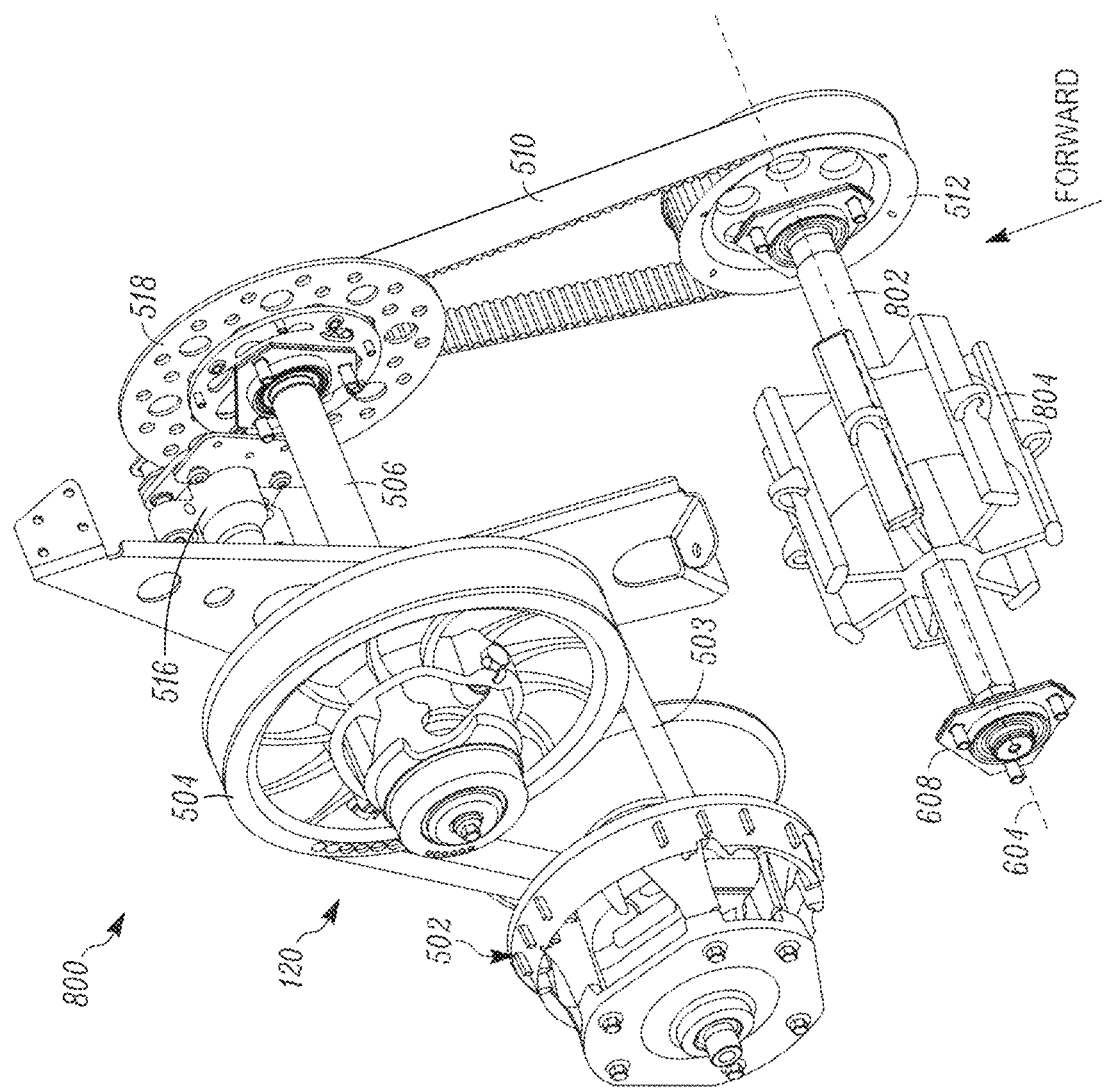
FIG. 8 illustrates a left side perspective view 800 of a drive line assembly, according to some embodiments.

Referring now to FIG. 8, a left side perspective view 800 of the drivetrain 120 is shown, according to some embodiments. Visible in this view is the drive or primary clutch 502, endless drive belt 503, driven or secondary clutch 504, jack shaft 506, brake assembly 516, brake disc 518, cogged belt/chain 510, lower sprocket 512, track drive shaft 802, and track drive sprocket 804. As discussed above with respect to FIG. 5, primary clutch 502 and secondary clutch 504 provide a continuously variable transmission (CVT) that transfers mechanical energy developed by in the engine to the transmission case that includes components such as the upper sprocket and lower sprocket 512, which in turn transfers the mechanical energy to track drive shaft 802. Track drive sprocket 804 transfers mechanical energy from track drive shaft 802 to the track drive (not shown). Dashed line 604 (shown in FIGS. 6 and 7) is drawn along the centerline axis of track drive shaft 802. Additional benefits of this configuration include the length of jack shaft 506 and track drive shaft 802 are reduced, thereby reducing the overall weight and cost of the drivetrain 120.

Figure 9:
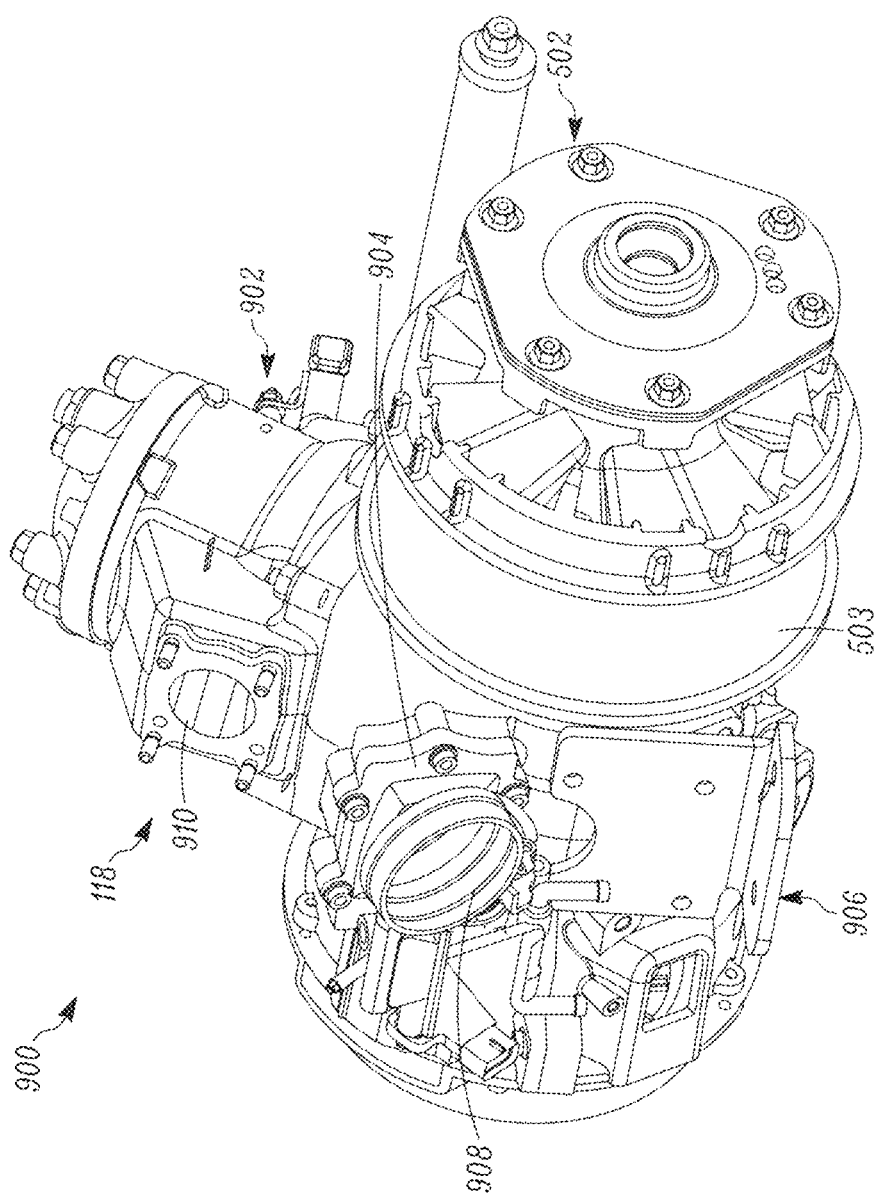
FIG. 9 illustrates a perspective view 900 of the snowmobile engine, according to some embodiments.

Referring now to FIG. 9, a perspective view 900 of the snowmobile single-cylinder engine 118 is illustrated, according to some embodiments. The single-cylinder engine 118 shown in FIG. 9 includes a cylinder head assembly 902, crankcase assembly 904, air intake port 908, which is coupled to intake manifold 704 (see FIG. 7), exhaust port 910, which is coupled to the exhaust system, and front mounting bracket 906. A primary drive clutch 502 is also illustrated, connected directly to the drive shaft of the engine 118. In this embodiment, the position of exhaust manifold 910 allows exhaust system 304 (shown in FIG. 3) to curl around the top of the engine 118 and under the seat 104 of the snowmobile. In some embodiments, the front mounting bracket 906 is a double puck style mounting bracket.

In other embodiments, single-cylinder engine 118 is replaced with a multi-cylinder engine (e.g., two-cylinder, four cylinder, etc.). In addition, the multi-cylinder engine may be a two-stroke type engine, or a four-stroke type engine. Depending on the dimensions of the engine 118, the amount of offset from the centerline of the snowmobile may be increased or decreased in order to fit engine 118 and drivetrain 120 within a desired width.

Figure 10:
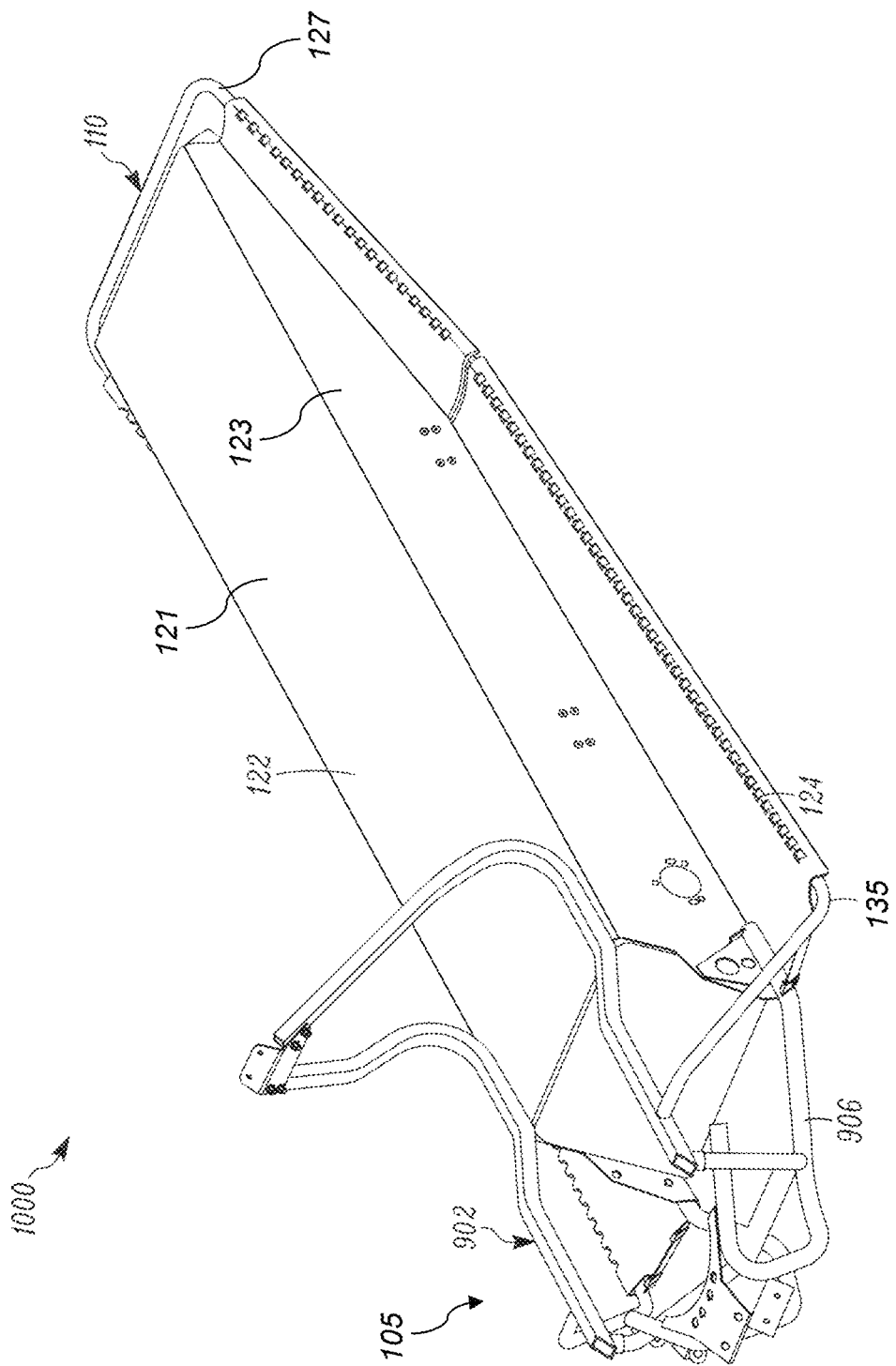
FIG. 10 illustrates a perspective view 1000 of a snowmobile chassis, according to some embodiments.

Referring now to FIG. 10, a perspective view 1000 of the snowmobile chassis/frame 110 is shown, according to some embodiments. Chassis/frame 110 includes the engine bay 402, located at the front of the snowmobile as well as tunnel 122. As discussed above, the tunnel includes running boards 124 located on each side of the tunnel 122. In the embodiment shown in FIG. 10, running boards 124 extend forward to a position at which engine frame support post 1004 and 1006 extend from tunnel 122 toward the engine bay 402.

Figure 11:
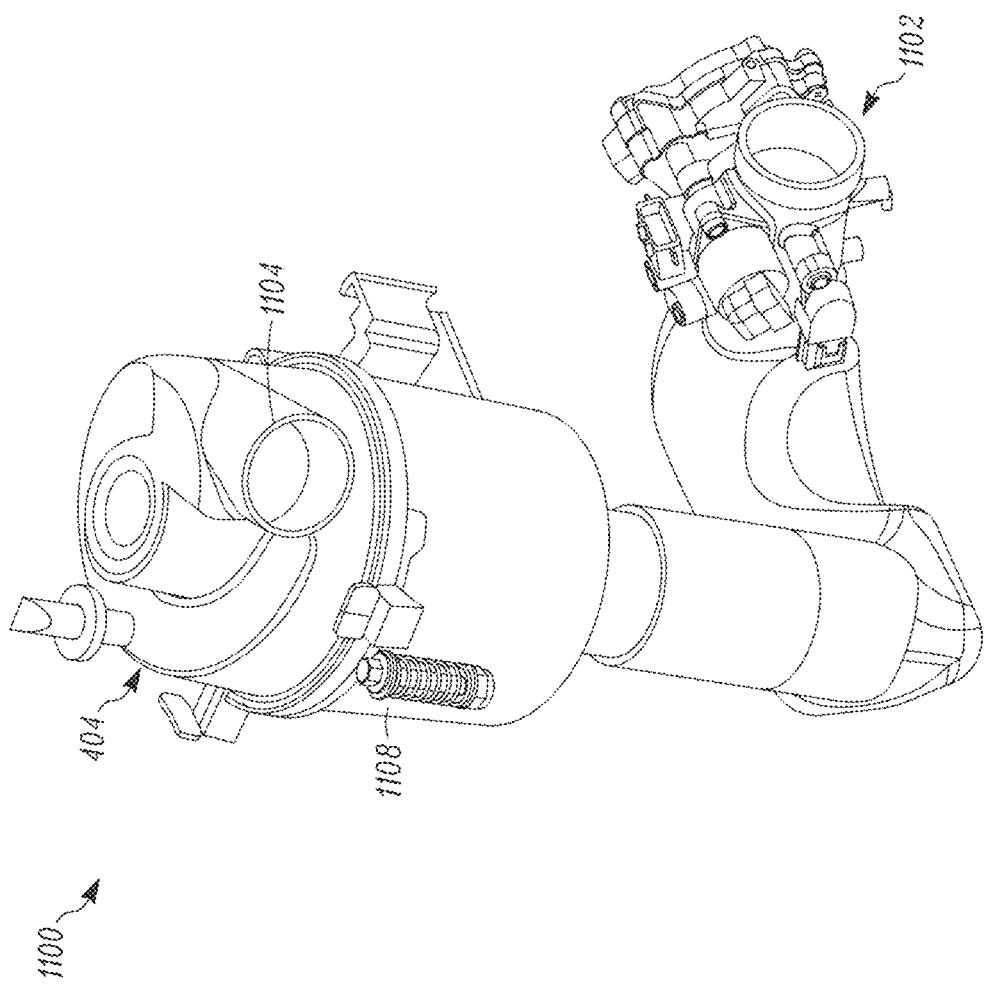
FIG. 11 illustrates a perspective view 1100 of an air intake filter, according to some embodiments.

Referring now to FIG. 11, a perspective view 1100 of a cyclonic air intake filter 404 is shown, according to some embodiments. Cyclonic air intake filter includes throttle body 1102, air inlet 1104, and filter chamber 1108. The cyclonic air filter communicates air provided at air inlet 1104 to filter chamber 1108. Once in the filter chamber 1108, incoming air within the filter chamber swirls (cyclonic swirling). The swirling action causes heavier particles (e.g., dust, dirt) to be pushed to the outside of the air chamber 1108, to be collected or discharged. The remaining air swirls through a filter (not shown) located within the filter chamber 1108 and the filtered air is output through throttle body 1102.

Figure 12:
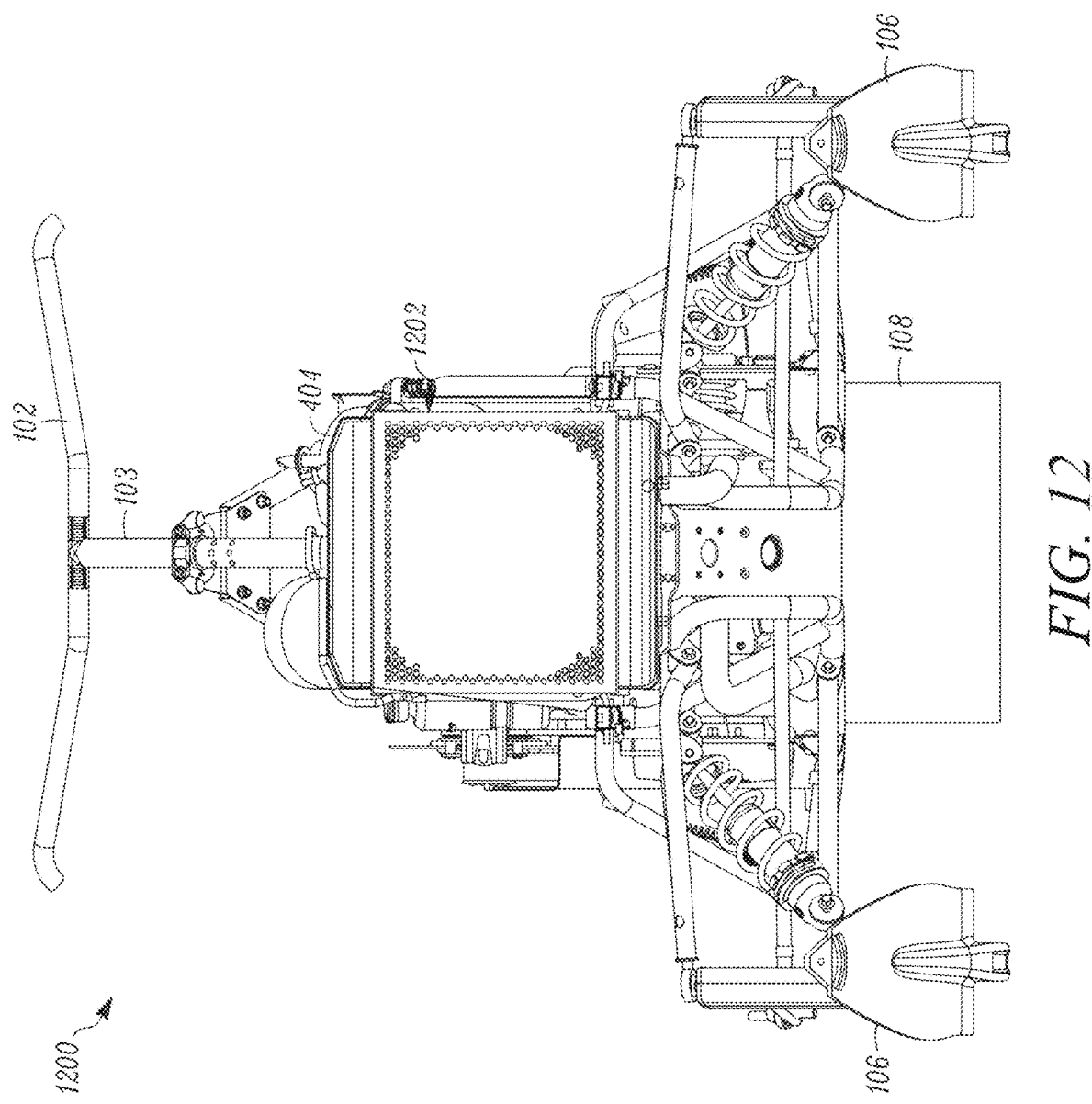
FIG. 12 illustrates a front view 1200 of a snowmobile with the integrated hood/bumper opened to illustrate a cooling system, according to some embodiments.

Referring now to FIG. 12, a front view 1200 of a snowmobile is shown with the hood/shroud opened to illustrate a radiator based cooling system 1202, according to some embodiments. In particular, in the embodiment shown in FIG. 12, a radiator 1202 is mounted on the front of the engine bay. Heat from the engine is removed via coolant pumped through the engine via a water pump (not shown), which can be engine driven or electric, and into the radiator 1202 to dissipate the heat via the collection of tubes and fins associated with radiator 1202. In the embodiment shown in FIG. 12, a fan mounted on the radiator blows air over the plurality of tubes/fins to aid in the dissipation of heat. A benefit of utilizing a radiator-based cooling system such as that shown in FIG. 12 as opposed to systems that rely on heat exchangers is the lower cost associated with this type of system as opposed to a system that utilizes heat exchangers. In some embodiments, however, a typical heat exchanger type system may be employed, for example under the tunnel, to dissipate heat generated by the engine 118.

Figure 13:
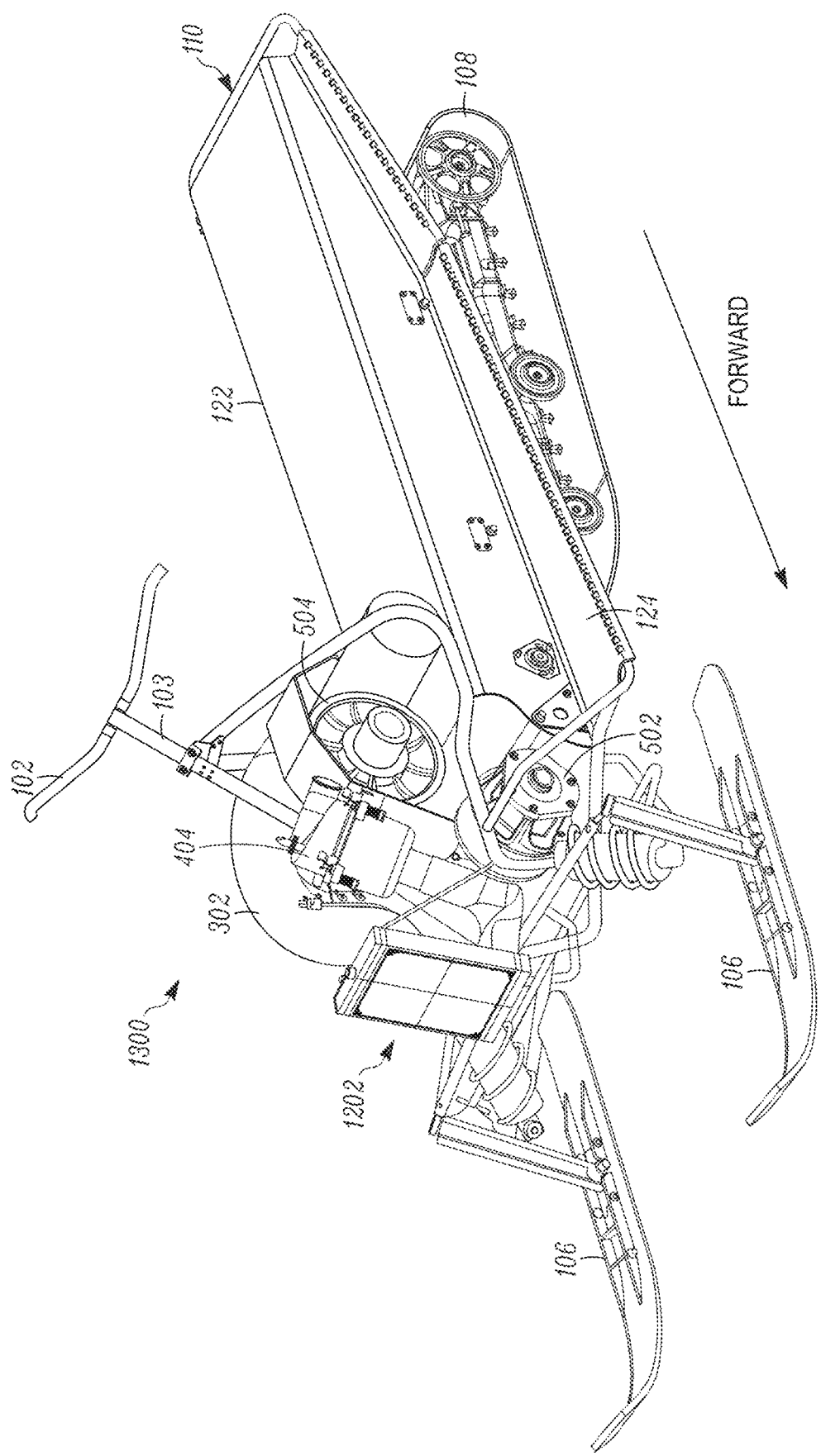
FIG. 13 illustrates a perspective view 1300 of the snowmobile with the integrated hood/bumper removed to illustrate the engine and drive line system, according to some embodiments.

Referring now to FIG. 13, a perspective view 1300 of the snowmobile is shown with the hood/shroud removed to illustrate the engine and drive line assembly components included in the engine bay. In particular, the embodiment shown in FIG. 13 illustrates a number of the features discussed individually with respect to FIGS. 3-12. Visible in the embodiment shown in FIG. 13 includes handlebars 102, steering shaft 103, skis 106, chassis/frame 110, tunnel 122, running boards 124, exhaust system 302 (extending away from the engine, but not shown extending along the top of tunnel 122), cyclonic air filter 404, primary clutch drive 502, secondary driven clutch drive 504, and radiator 1202. Attached to primary clutch drive 502, but obscured in this view, is single-cylinder engine 118.

Referring now to FIG. 14, a perspective view 1400 illustrates the inclusion of a rack assembly 1402 physically mounted to bumper 114. As discussed with respect to FIGS. 1 and 2, the embodiment shown in FIG. 14 utilizes an integrated hood/bumper 111. In the embodiment shown in FIG. 14, a rack 1402 is mounted to the bumper assembly 114. In particular, rack 1402 provides a frame to which objects or gear may be attached to and retained by. Rack 1402 may be removable attached to bumper 114, or may be integrated as part of bumper 114.

While the disclosed snowmobile has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A snow vehicle, comprising:
   a tunnel including a side panel, a top panel, a rear end, and a forward end;
   a forward frame secured to the forward end of the tunnel;
   a bumper positioned at the rear end of the tunnel, the bumper including a bumper arm positioned along the side panel of the tunnel;
   a support member positioned outboard of the side panel and along a bottom edge of the side panel, the support member secured to the forward frame and extending rearward from the forward frame; and
   a skid rail positioned under the tunnel,
   wherein the support member is secured to the bumper arm to define a continuous rail along the side panel and the rear end of the tunnel, and
   wherein the support member extends rearward from a forward end of the skid rail.

2. The snow vehicle of claim 1, wherein the side panel vertically extends between the top panel and the continuous rail, wherein no portion of the side panel extends below a bottom surface of the continuous rail.

3. The snow vehicle of claim 1, wherein the support member extends rearward from a track drive shaft.

4. The snow vehicle of claim 1, wherein the support member and the bumper define a tubular shape, wherein the continuous rail defines a continuous tube along the side panel and the rear end of the tunnel.

5. The snow vehicle of claim 1, wherein the support member extends rearward from the forward frame to the bumper arm along a line that extends toward a centerline of the snow vehicle.

6. The snow vehicle of claim 1, wherein the side panel includes a forward portion having a first bottom edge extending along a first length and a rearward portion having a second bottom edge extending along a second length, wherein the second bottom edge is vertically offset from the first bottom edge.

7. The snow vehicle of claim 6, wherein the bumper arm extends along the second bottom edge and the support member includes a running board extending along the first bottom edge.

8. The snow vehicle of claim 7, wherein the support member includes a kick-up extending from the first bottom edge to the second bottom edge.

9. The snow vehicle of claim 8, wherein the support member is spaced apart from the side panel along the forward portion of the side panel.

* * * * *